Patented Apr. 26, 1927.

1,626,562

UNITED STATES PATENT OFFICE.

ERNST SILTEN, OF BERLIN, GERMANY.

PROCESS FOR MAKING THERAPEUTIC MATERIALS.

No Drawing. Application filed December 5, 1924. Serial No. 754,197.

The object of my invention is the transformation of the salts of the 2-arylchinoline 4-carboxylic acids and their derivatives into a form in which they may be used for medical-therapeutical purposes.

A further object of my invention is the production of medicaments derived from 2-arylchinoline 4-carboxylic acids adapted for medical purposes, particularly in the form of intravenous injections which shall not give rise to noxious incidental symptoms.

Furthermore my invention concerns a new product containing the anhydride of phenylcinchophenic acid and hexamethylene tetramine in certain proportions, which product is well adapted for the above-mentioned therapeutic purposes and has a remarkable effect on all inflammatory processes.

I am aware that certain salts of 2-arylchinoline 4-carboxylic acids and their derivatives with hexamethylene tetramine are known. They were obtained in the form of well characterized addition-compounds.

It was characteristic of these known compounds that on being dissolved in water they decomposed into their components and as a result their employment for the purposes of intravenous therapy was precluded. When used internally there was the serious inconvenience that these compounds were at once subjected to decomposition in the stomach owing to which process the stomach and thus the patient's state of health were affected in a very unfavourable way, especially by the arylcinchophenic acid component.

I have now found that the said salts of the 2-arylchinoline 4-carboxylic acids and their derivatives will dissolve without any decomposition and in considerable concentration in, say, 15–50 per cent aqueous solutions of hexamethylene tetramine.

Furthermore, I have ascertained that these solutions may thus be preserved, transported, e. g. in closed ampullas, and also be used for the above-mentioned therapeutic purposes, preferably in the intravenous way, without the risk of ensuing symptoms of decomposition and their detrimental consequences.

The employment of a, say, 30 per cent aqueous solution of hexamethylene tetramine has proved to be especially recommended as a solvent, as by this means solutions can be obtained containing the equivalent of 15 per cent or more of the known hexamethylene tetramine salt of phenylcinchophenic acid.

*Examples.*

First of all the hexamethylene tetramine salt of phenylcinchophenic acid is produced by the known process, i. e. by dissolving 140 gr. of hexamethylene tetramine in five times its weight of pure alcohol, adding 250 gr. of 2-phenylchinoline 4-carboxylic acid and heating till complete dissolution is achieved. By cooling down, the crystalline salt which has the following formula separates out:—

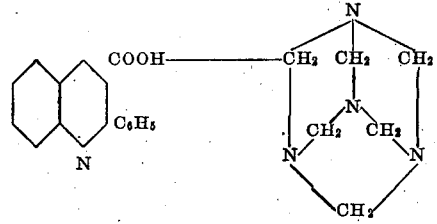

Thereafter 150 gr. of the crystals obtained are dissolved, while heating, in 1000 ccm. of a 30 per cent hexamethylene tetramine solution.

In this connection it may be observed that the proportion of the known hexamethylene salt of phenyl cinchophenic acid to hexamethylene tetramine is 150:300, that is to say, nearly five molecules of the former to one of the latter, or, in other words, 6 molecules of hexamethylene tetramine to one molecule of the acid, from which it would seem that some definite new compound is formed, a view which appears to be confirmed by the remarkable difference in properties of the product in accordance with the invention and the previously known hexamethylene derivatives of phenyl cinchophenic acid.

Alternatively the whole quantity of hexamethylene tetramine may be added at the beginning or in stages without the separation of the intermediate product provided that aqueous solutions are used.

The new preparations have the specific property of deadening all symptoms of inflammation occurring in external, internal and surgical medicine, thus forming an excellent remedy for treating diseases in this extensive domain. The effect mentioned was not to be foreseen, as none of the 2-arylchinoline 4-carboxylic acids hitherto known, or their known preparations containing hexamethylene tetramine derivatives, exhibited in the least degree this property of stopping inflammation.

With intravenous applications of the new preparations I have found in particular that their effect is remarkably good, if the solutions in question are neutral or are weakly alkaline, to secure which condition crystallized sodium carbonate or other suitable alkaline material may be added until a weak alkaline reaction to litmus is shown by a sample diluted with 10 parts of water.

Claims:

1. Process for the production of products available for therapeutical purposes, which comprises dissolving derivatives of 2-arylchinoline 4-carboxylic acid anhydrides in a solution of hexamethylene tetramine in such proportions that there is present in the product more than one molecule of hexamethylene tetramine to each molecule of acid anhydride.

2. Process for the production of products available for therapeutical purposes, which comprises dissolving derivatives of 2-arylchinoline 4-carboxylic acid anhydrides in an aqueous solution of hexamethylene tetramine in such proportions that there is present in the product more than one molecule of hexamethylene tetramine to each molecule of acid anhydride.

3. Process for the production of products available for therapeutical purposes, which comprises dissolving 2-arylchinoline 4-carboxylic acid anhydride in a solution of hexamethylene tetramine in such proportions that the product contains substantially one molecule of acid anhydride to each six molecules of hexamethylene tetramine.

4. Process for the production of products available for therapeutical purposes, which comprises dissolving 2-arylchinoline 4-carboxylic acid anhydride in an aqueous solution of hexamethylene tetramine in such proportions that the product contains substantially one molecule of acid anhydride to each six molecules of hexamethylene tetramine.

5. Process for the production of products available for therapeutical purposes, which comprises dissolving in an aqueous solution of hexamethylene tetramine containing not less than 15 per cent of hexamethylene tetramine a proportion of a derivative of 2-arylchinoline 4-carboxylic acid anhydride such as to yield a product containing more than one molecule of hexamethylene tetramine to each molecule of the acid anhydride.

6. Process for the production of products available for therapeutical purposes, which comprises dissolving in an aqueous solution of hexamethylene tetramine containing not less than 15 per cent of hexamethylene tetramine a proportion of a derivative of 2-arylchinoline 4-carboxylic acid anhydride such as to yield a product containing substantially six molecules of hexamethylene tetramine to each molecule of the acid anhydride.

7. Process for the production of products available for therapeutical purposes, which comprises dissolving in an aqueous solution of hexamethylene tetramine containing not less than 30 per cent of hexamethylene tetramine a proportion of a derivative of 2-arylchinoline 4-carboxylic acid anhydride such as to yield a product containing more than one molecule of hexamethylene tetramine to each molecule of the acid anhydride.

8. Process for the production of products available for therapeutical purposes, which comprises dissolving in an aqueous solution of hexamethylene tetramine containing not less than 27 per cent of hexamethylene tetramine a proportion of a derivative of 2-arylchinoline 4-carboxylic acid anhydride such as to yield a product containing substantially six molecules of hexamethylene tetramine to each molecule of the acid anhydride.

9. Process for the production of products available for therapeutical purposes, which comprises dissolving in an aqueous solution of hexamethylene tetramine containing more than 15 per cent of hexamethylene tetramine a proportion of 2-arylchinoline 4-carboxylic acid adapted to yield a product containing more than one molecule of hexamethylene tetramine for each molecule of the acid.

10. Process for the production of products available for therapeutical purposes, which comprises dissolving in an aqueous solution of hexamethylene tetramine containing more than 15 per cent of hexamethylene tetramine a proportion of 2-arylchinoline 4-carboxylic acid adapted to yield a product containing substantially six molecules of hexamethylene tetramine for each molecule of the acid.

11. Process for the production of products available for therapeutical purposes, which comprises dissolving in an aqueous solution of hexamethylene tetramine containing more than 30 per cent of hexamethylene tetramine a proportion of 2-arylchinoline 4-carboxylic acid adapted to yield a product containing more than one molecule of hexamethylene tetramine for each molecule of the acid.

12. Process for the production of products available for therapeutical purposes, which comprises dissolving in an aqueous solution of hexamethylene tetramine containing more than 27 per cent of hexamethylene tetramine a proportion of 2-arylchinoline 4-carboxylic acid adapted to yield a product containing substantially six molecules of hexamethylene tetramine for each molecule of the acid.

13. Process for the production of products available for therapeutical purposes, which comprises dissolving in an aqueous solution of hexamethylene tetramine containing more than 15 per cent of hexamethylene tetramine a proportion of 2-arylchinoline 4-carboxylic acid adapted to yield a product containing more than one molecule of hexamethylene tetramine for each molecule of the acid and reducing the solution to a non-acid condition.

14. Process for the production of products available for therapeutical purposes, which comprises dissolving in an aqueous solution of hexamethylene tetramine containing more than 15 per cent of hexamethylene tetramine a proportion of 2-arylchinoline 4-carboxylic acid adapted to yield a product containing substantially six molecules of hexamethylene tetramine for each molecule of the acid and reducing the solution to a non-acid condition.

15. Process for the production of products available for therapeutical purposes, which comprises dissolving in an aqueous solution of hexamethylene tetramine containing more than 30 per cent of hexamethylene tetramine a proportion of 2-arylchinoline 4-carboxylic acid adapted to yield a product containing more than one molecule of hexamethylene tetramine for each molecule of the acid and reducing the solution to a non-acid condition.

16. Process for the production of products available for therapeutical purposes, which comprises dissolving in an aqueous solution of hexamethylene tetramine containing more than 27 per cent of hexamethylene tetramine a proportion of 2-arylchinoline 4-carboxylic acid adapted to yield a product containing substantially six molecules of hexamethylene tetramine for each molecule of the acid and reducing the solution to a non-acid condition.

17. A new product suitable for therapeutical use and especially for intravenous application being an aqueous solution comprising a hexamethylene tetramine derivative of 2-arylchinoline 4-carboxylic acid containing more than one molecule of hexamethylene tetramine for each molecule of acid present.

18. A new product suitable for therapeutical use and especially for intravenous application, being an aqueous solution comprising a hexamethylene tetramine derivative of 2-arylchinoline 4-carboxylic acid containing substantially six molecules of hexamethylene tetramine for each molecule of acid present.

19. A new product suitable for therapeutical use and especially for intravenous application, being an aqueous solution comprising a hexamethylene tetramine derivative of phenylcinchophenic acid containing more than one molecule of hexamethylene tetramine for each molecule of acid present.

20. A new product suitable for therapeutical use and especially for intravenous application, being an aqueous solution comprising a hexamethylene tetramine derivative of phenylcinchophenic acid containing substantially six molecules of hexamethylene tetramine for each molecule of acid present.

21. A new product suitable for therapeutical use and especially for intravenous application, being an aqueous solution comprising a hexamethylene tetramine derivative of 2-arylchinoline 4-carboxylic acid containing more than one molecule of hexamethylene tetramine for each molecule of acid present, the proportion of water by weight relatively to the hexamethylene tetramine being not less than 85 parts to 15 parts.

22. A new product suitable for therapeutical use and especially for intravenous application, being an aqueous solution comprising a hexamethylene tetramine derivative of 2-arylchinoline 4-carboxylic acid containing substantially six molecules of hexamethylene tetramine for each molecule of acid present, the proportion of water by weight relatively to the hexamethylene tetramine being not less than 85 parts to 15 parts.

23. A new product suitable for therapeutical use and especially for intravenous application, being an aqueous solution comprising a hexamethylene tetramine derivative of phenylcinchophenic acid containing more than one molecule of hexamethylene tetramine for each molecule of acid present, the proportion of water by weight relatively to the hexamethylene tetramine being not less than 85 parts to 15 parts.

24. A new product suitable for therapeutical use and especially for intravenous application, being an aqueous solution comprising a hexamethylene tetramine derivative of phenylcinchophenic acid containing substantially six molecules of hexamethylene tetramine for each molecule of acid present, the proportion of water by weight relatively to the hexamethylene tetramine being not less than 85 parts to 15 parts.

25. A new product suitable for therapeutical use and especially for intravenous application, being an aqueous solution comprising a hexamethylene tetramine derivative of 2-arylchinoline 4-carboxylic acid containing more than one molecule of hexamethylene tetramine for each molecule of acid present, the proportion of water by weight relatively to the hexamethylene tetramine being as 70 is to 30.

26. A new product suitable for therapeutical use and especially for intravenous application, being an aqueous solution comprising a hexamethylene tetramine derivative of 2-arylchinoline 4-carboxylic acid containing substantially six molecules of hexamethylene tetramine for each molecule of acid present, the proportion of water by weight relatively to the hexamethylene tetramine being as 73 is to 27.

27. A new product suitable for therapeutical use and especially for intravenous application, being an aqueous solution comprising a hexamethylene tetramine derivative of phenylcinchophenic acid containing more than one molecule of hexamethylene tetramine for each molecule of acid present, the proportion of water by weight relatively to the hexamethylene tetramine being as 70 is to 30.

28. A new product suitable for therapeutical use and especially for intravenous application, being an aqueous solution comprising a hexamethylene tetramine derivative of phenylcinchophenic acid containing substantially six molecules of hexamethylene tetramine for each molecule of acid present, the proportion of water by weight relatively to the hexamethylene tetramine being as 73 is to 27.

In testimony whereof I affix my signature.

Dr. ERNST SILTEN.